Feb. 6, 1923.
C. R. SHORT.
STEERING GEAR.
FILED MAY 23, 1921.
1,444,563.
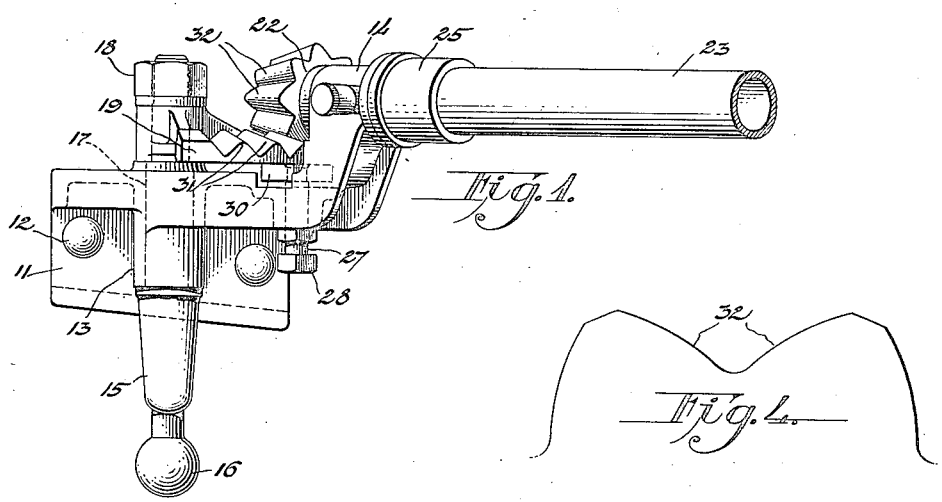
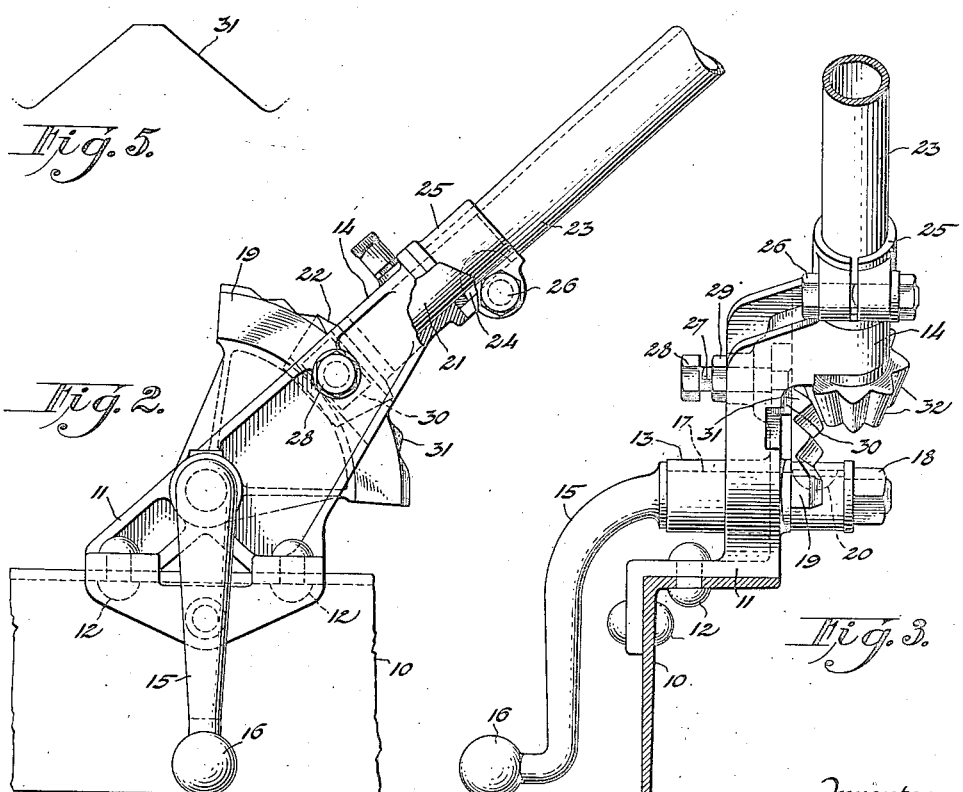
Witnesses
G. L. Prue
R. K. Lee
Inventor.
Charles R. Short
By his Attorney:
Francis D. Hardesty Patented Feb. 6, 1923.

1,444,563

UNITED STATES PATENT OFFICE.

CHARLES R. SHORT, OF DAYTON, OHIO, ASSIGNOR TO GENERAL MOTORS RESEARCH CORPORATION, OF DAYTON, OHIO, A CORPORATION OF DELAWARE.

STEERING GEAR.

Application filed May 23, 1921. Serial No. 471,868.

*To all whom it may concern:*

Be it known that I, CHARLES R. SHORT, a subject of the King of Great Britain, residing at Dayton, county of Montgomery, and State of Ohio, have invented certain new and useful Improvements in Steering Gears, of which the following is a full, clear, and exact description.

The invention relates to gear sets of the type generally employed in transmitting power from the steering wheel or the like to the dirigible elements of a vehicle. In power transmitting devices of this type it is highly desirable to provide means for hindering the transmission of motion or shocks from the actuated devices to the actuating means in order to avoid discomfort for the operator and to facilitate the maintenance of the actuated devices in the adjusted position.

The principal object of my invention therefore is to provide a steering gear for automobiles or the like in which the transmission of shocks from the road wheels to the steering wheel is materially hindered.

A further object is to provide an arrangement of power transmitting devices especially adapted for use in steering gears which shall be very simple and compact in construction and capable of being readily assembled and disassembled, and which shall have a high degree of efficiency for the purpose for which it is designed.

With the above and other objects in view, as will appear more fully from the following description, the invention comprises the features of novelty herein disclosed, together with such variations and modifications as may be included in the scope of the appended claims.

In the accompanying drawings illustrating one embodiment of my invention,

Fig. 1 is a plan view of a form of steering gear adapted for use in an automobile;

Fig. 2 is a side elevation and Fig. 3 an end elevation of the structure shown in Fig. 1; and Figs. 4 and 5 are diagrammatic views respectively of the teeth of the pinion and of the segment employed in the embodiment of the invention shown in Figs. 1 to 3.

Referring to the drawings, 10 indicates a frame member which may be one of the side members of an automobile frame of ordinary construction. A bracket 11 is secured to the frame as by rivets 12, which bracket is provided with a bearing sleeve 13 and a second bearing sleeve 14 at right angles to the sleeve 13. An actuated device 15, shown as a steering arm having a ball 16 for connection with a drag link, is provided with a journal 17 mounted within the bearing sleeve 13 and with a threaded end to receive a nut 18. A gear sector 19 is mounted upon the arm 15 between the nut 18 and the bracket 13 and is secured to the arm to rotate therewith as by a key connection 20.

In the bearing sleeve 14 is journalled a stub shaft 21 carrying at the lower end a pinion 22 arranged to mesh with the teeth of the sector 19. The upper end of the stub shaft projects above the bracket 11 and engages within the end of a tubular member 23 which may be the rotatable steering post or analogous element of an automobile steering mechanism and will preferably be provided at its upper end with a steering wheel (not shown). In order to provide for the securing of the pinion to post 23 and for the convenient assembly or removal of the parts, I may utilize a key 24 extending through a slot in the member 23 and into a keyway in the stub shaft 21. A split sleeve 25 surrounds the member 23 and retains the key 24 in its seat, being clamped in position by a bolt 26. The lower end of the sleeve 25 engages with the upper surface of the bearing sleeve 14 and serves as a thrust bearing for the steering post and the parts carried thereby.

Mounted in a transverse aperture in the bracket 11 is a pin 27 having a head 28 to receive a wrench and screw threads to receive a lock nut 29. Secured to the pin at its inner end is a friction plate 30 so positioned as to engage with the rear face of sector 19 opposite the gear teeth 31. By varying the adjustment of the plate 30 it is possible to vary the frictional resistance to the movement of the sector 19 as influenced by the application of force to the arm 15.

The teeth 32 of the pinion 22 and the teeth 31 of the sector 19 are cut with an unusually high pressure angle, an involute angle in excess of 30° being shown for example in Figs. 4 and 5, in order thereby to increase by a wedging action the tendency of the sector to be forced away from the pinion by the reaction between the teeth. It will be seen that by this means the resistance to movement due to application of power to the arm 15 tending to rotate the sector and thereby rotate the pinion may be increased to practically any desired extent. The gearing is therefore rendered at least partially irreversible and, in the case of steering gears, the transmission of shocks from the road wheels to the steering wheel or the like is materially reduced.

It will be understood that the particular angle of gear tooth to be employed will vary somewhat in accordance with the degree of locking action considered desirable. Other changes in details of construction may be made without departing from the scope of the invention and therefore I do not desire to be limited to the specific structure described except as required by the language of the appended claims.

I claim:

1. A steering gear comprising a toothed pinion connected to suitable means for manual operation, a toothed gear member engaging with said pinion and suitably connected to elements to be steered, and a body providing a surface with which said gear member contacts, the engaging surfaces of said teeth having a high pressure angle tending to force said member against said surface and produce sufficient friction to substantially prevent the transmission of shocks from said steered elements to said manual operating means.

2. A steering gear comprising a toothed pinion connected to suitable means for manual operation, a toothed gear member engaging with said pinion and suitably connected to elements to be steered, and a body providing a surface with which said gear member contacts, the engaging surfaces of said teeth having a high pressure angle tending to force said member against said surface and produce sufficient friction to substantially prevent the transmission of shocks from said steered elements to said manual operating means, the said contacting surface of the said body being adjustable toward and from the gear member.

3. A steering gear comprising a supporting body, a toothed sector provided with means for connection to elements to be steered, a toothed bevel pinion mounted upon an axis substantially at right angles to the axis of said sector and engaging the teeth thereof, and manually operable means for actuating said pinion; the teeth of said pinion and sector being formed with an abnormally high pressure angle whereby a wedging action is produced between said toothed elements tending to force the sector against the said body and producing friction to hinder the transmission of shocks from said steered elements to said manual actuating means.

4. A steering gear comprising a supporting bracket, a pinion having a stub shaft rotatably supported in said bracket, means cooperating with said pinion and adapted to transmit motion to elements to be steered, a tubular post fitting over the end of said stub shaft and keyed thereto and a clamping sleeve surrounding said post and arranged to rotate in engagement with said bracket.

5. A steering gear comprising a supporting bracket, the upper end thereof constituting a thrust bearing member; a pinion having a stub shaft rotatably supported in said bracket, means cooperating with said pinion and adapted to transmit motion to elements to be steered; a tubular post secured over the end of said stub shaft by means of a clamping member abutting said thrust bearing member and adapted to transfer the thrust of the post and parts carried thereby to the supporting bracket.

In testimony whereof I hereto affix my signature.

CHARLES R. SHORT.

Witnesses:
 R. K. LEE,
 A. C. LEHMAN.